United States Patent [19]

Connors

[11] 4,220,014

[45] Sep. 2, 1980

[54] APPARATUS FOR PROLONGED STORAGE OF GARBAGE

[76] Inventor: William P. Connors, 12 Wakefield St., Reading, Mass. 01867

[21] Appl. No.: 953,200

[22] Filed: Oct. 20, 1978

Related U.S. Application Data

[60] Continuation of Ser. No. 843,021, Oct. 17, 1977, abandoned, which is a division of Ser. No. 697,220, Jun. 17, 1976, abandoned.

[51] Int. Cl.[3] .................... B60H 3/04

[52] U.S. Cl. .................... 62/239; 62/341; 62/418; 62/457

[58] Field of Search .................... 62/239, 457, 341, 418, 62/9

[56] References Cited

U.S. PATENT DOCUMENTS

| | | | |
|---|---|---|---|
| 2,809,812 | 10/1957 | Erickson et al. | 62/239 |
| 3,650,120 | 3/1972 | Harza | 62/62 |

*Primary Examiner*—Ronald C. Capossela

*Attorney, Agent, or Firm*—Weingarten, Maxham & Schurgin

[57] ABSTRACT

An insulated container is kept at a temperature slightly above freezing and increments of garbage are fed into the container over an extended period of time. A refrigeration unit is positioned through the top wall of the container so that its evaporator section extends into a perforated baffle within the container.

5 Claims, 4 Drawing Figures

APPARATUS FOR PROLONGED STORAGE OF GARBAGE

This is a continuation of application Ser. No. 843,021, filed Oct. 17, 1977 now abandoned which is a division of application Ser. No. 697,220, filed June 17, 1976 now abandoned.

Background of Invention

This invention relates to the disposal of solid waste and in particular to the disposal of garbage and the like.

Because of increasing concern with environmental pollution, previously used methods such as burning for disposal of garbage and similar waste are no longer permitted. In most instances waste of this sort must be transported to a location where it can be treated or buried. In urban communities where the problem of waste disposal is most severe, there has evolved a system of waste disposal which utilizes large metal storage containers. These metal containers are kept adjacent or on the premises of an apartment building or restaurant and periodically removed for dumping or dumped into a pick-up truck for removal. However, in warm weather and in warm climates the garbage in such containers often emits undesirable odors and are a source of growth of insects and rodents.

Attempts have been made to solve this problem by more frequent emptying of the containers. However the costs of more frequent emptying is exceedingly high and makes this method of waste removal uneconomical. It has also been proposed that garbage be kept in a frozen state until it is finally disposed of. This is likewise impractical and excessively costly.

One object of the present invention is to provide a method and apparatus for improving the handling of garbage by storage containers so as to minimize odors and putrefaction and insect and rodent infestation.

A further object of this invention is to provide such a method and apparatus which can be readily adapted to the present storage containers with little additional expense in the total cost of garbage disposal.

Other objects and advantages of this invention will be apparent from the description and claims which follow taken together with the appended drawings.

Summary of Invention

The invention comprises generally an improved method for the storage of garbage and the like involving the use of an insulated container. The temperature of the interior of the container is constantly maintained at a temperature in a range from above freezing to about 36 degrees F. Small increments of garbage or the like are periodically fed into the container and the container is emptied at convenient times.

A preferred apparatus for this method comprises using an enclosed insulating container having two openings. The first opening is the one through which the increments of waste are fed into the container. The second opening is positioned above the first opening. A refrigeraton unit is positioned in the second opening and has its evaporator section extend through into the container. The container has a perforated baffle which surrounds the evaporator section while the compressor section of the refrigeration unit is exterior to the container. The first or feed opening can be in a door which with a gasket forms a portion or all of an end wall of the container. The baffle preferably has solid walls where it is adjacent to the evaporator section so that there is longitudinal air flow through the evaporator section. The refrigeraton unit has a flange which permits either permanent welding so as to seal the second opening or has removable fastening means such as bolts so that it can be removed from the container before the container with its garbage is transported to a dumping spot. The container body preferably comprises a steel inside body wall, an intermediate layer of insulation and an exterior metal skin.

The refrigeration unit of this inventon is a packaged, self-contained system and the second opening is preferably located through the top wall near the front of the container. In a container having dimensions for example of 8 ft. width, 13 foot length and 6 ft. height, with a capacity of 20 cubic yards the second opening would be about 2 feet square and be located about 2½ feet from the wall containing the first or loading opening. The refrigeraton system contains appropriate conventional controls for pressure and temperature and also in the exterior, condensing section has an electrical connection. The exterior condensing section is preferably provided with a waterproof cover. The refrigeraton unit can also include a low ambient temperature control package such as a crank case, heater, fan control, temperature - pressure control and solenoid shroud. This enables the refrigeration system to operate efficiently where the outside or ambient temperature is below about 40 degrees F. The capacity and design of such system will be dictated by the size of the container and the average ambient temperature to which it is exposed.

The evaporator section of the refrigeration unit, which includes cooling coils and blower is positioned in the perforated metal housing so that the flow of air goes from the inlet side through the evaporator to the outlet side. The baffle is approximately the same width as the evaporator coil housing and preferably has an upward sweep on the outlet side.

Specific Example of Invention

Figure 1:
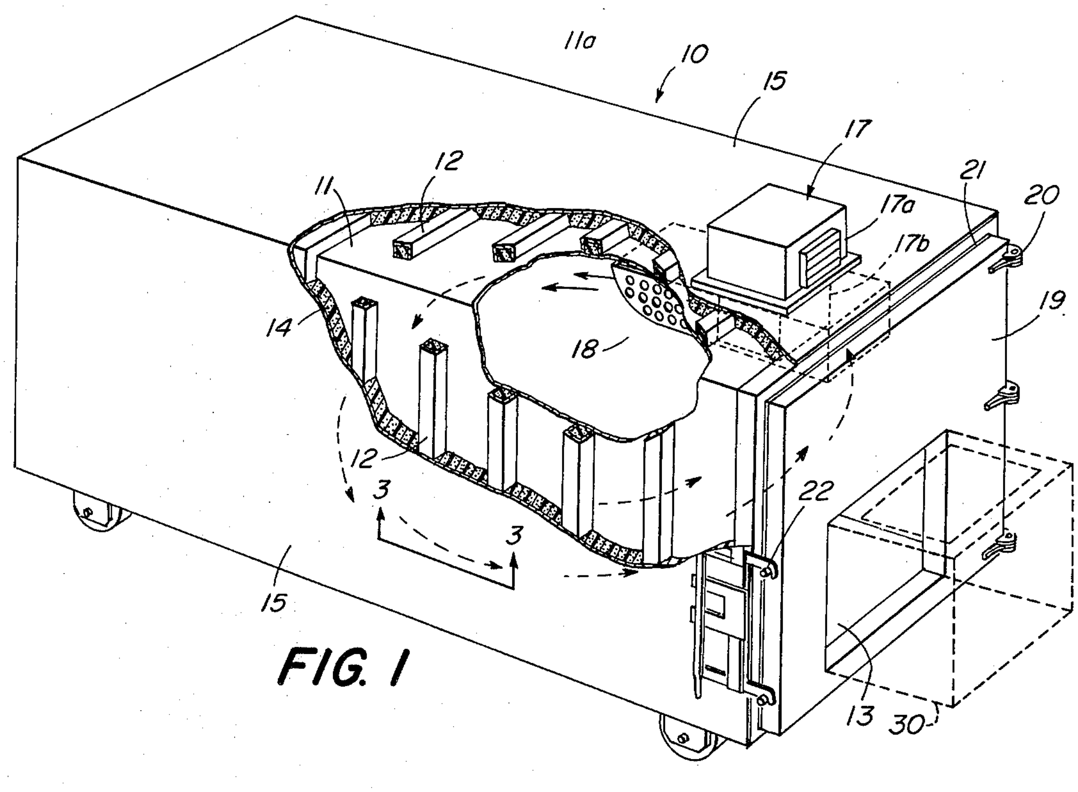
FIG. 1. Is a perspective view of the partial cutaway of a preferred apparatus for carrying out the present invention.
Figure 3:
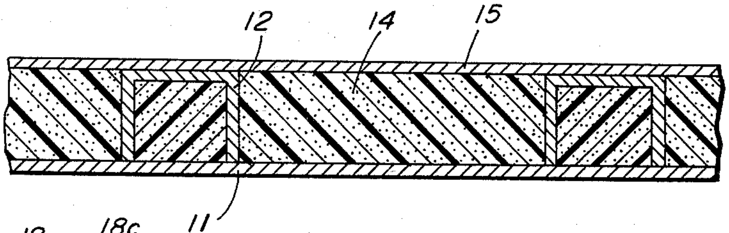
FIG. 3. is a section through line 3—3 of FIG. 1 showing the wall construction.

A specific example of the apparatus of this invention is illustrated in the drawing. The elongated large steel container body 11 is closed on five sides but has one end in the form of a door 19 having an opening 13 through which garbage or similar waste is fed by a compactor. Door 19, has hinges 20, locks 22 and a sealing gasket 21. The steel body 11 has stiffening ribs 12. The hollow spaces in the stiffening ribs is filled and the entire outer surface of body 11 including the door 19 are covered with an insulating material as for example foamed polystyrene 14. A metal skin 15 surrounds the insulating material 14. A typically sized container body is one approximately 8 feet wide, 12 feet long and 6 feet high with a capacity of about 20 cubic yards. In such a container a 3-inch thickness of polystyrene foam insulation is adequate.

About 30 inches from door 19 is an opening **11*aa* in the top wall 11*a* of the container. The opening 11*aa* extends through the skin 15, the ribbing 12 and the insulation 14. Positioned below this opening is a hollow metal baffle shell 18 which extends from the door wall 19 forward. Shell 18 has a solid bottom wall portion 18*a*, a curved front perforated portion 18*b* and two side wall portions 18*c* each of which has an intermediate solid area 18*d* and end perforated areas 18*e* and 18*f*. Perforations can be of various sizes for adequate air flow as for example ½" holes spaced one inch apart. Baffle 18 is attached by welding its upper edges to the upper steel wall 11*a* of the container so that the opening 11*aa* in wall 11*a* registers with the intermediate solid portions 18*d***.

A refrigerating apparatus 17 is suspended through opening **11*aa* which can be on the order of two foot square. Condensing section 17*a* including the compressor, condensor and electrical supply is outside the container body 11, while the evaporating section 17*b* with its evaporator fan and cooling coils is within shell 18 in container 11. Refrigeration unit 17 can either be bolted by its flange to wall 11*a*** as a permanent installation or can be removably attached by its flange for removal at each container pick up.

Figure 4:
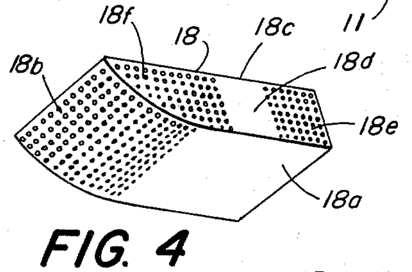
FIG. 4. is a diminished perspective view of the baffle 18.
Figure 2:
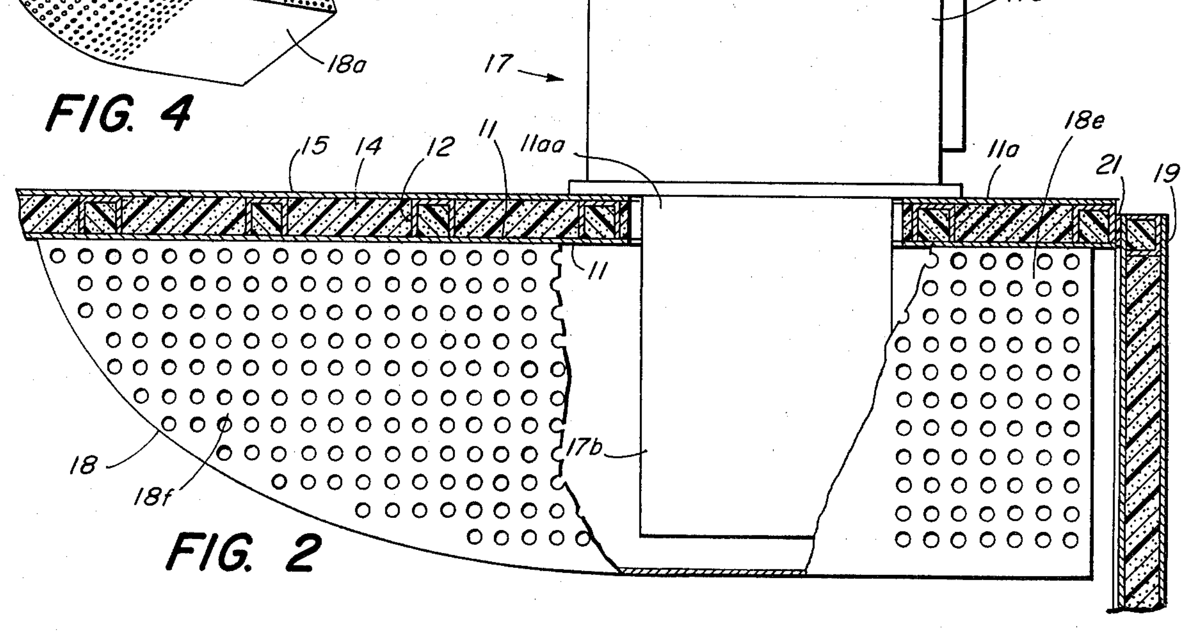
FIG. 2. is a side elevation with partial cutaway of the baffle 18 illustrated in FIG. 1.

As indicated in FIGS. 1 and 4 the flow of air is inward from the sides **18*e* through the evaporator section 17*b* and then out through perforated end and wall sections 18*b* and 18*f***.

In operation a compactor 30 pushes increments of waste through the opening 13 which is otherwise closed. The refrigeration apparatus 17 is regulated to provide a selected refrigerator temperature, as for example 34 degrees F.

Inasmuch as the increments of waste are not all added at one time, a relatively small refrigerator apparatus, as for example of one horsepower 9,000 BTU per hour capacity unit, is generally sufficient for a 20 cubic yard container.

I claim:

1. An apparatus for the prolonged storage of garbage and the like, comprising an enclosed, elongated, insulated container having a first opening; compactor means for feeding increments of waste into said container at said first opening and for moving said increments of waste from said one end to an opposing end of said container; a second opening through the roof of said container at said one end closely adjacent said first opening; a refrigeration unit which has its evaporator section extending through said second opening into the container, said refrigeration unit being adapted to cool said waste increments without freezing thereof; means including a perforated baffle being provided to surround said evaporator section for providing a longitudinal air flow at said roof away from said one end in the direction of movement of said waste increments; the compressor section of said refrigeration unit being exterior to said container; the top of said first opening being below the bottom of said evaporator.

2. The apparatus of claim 1 wherein said first opening is in the door which forms a portion of the end wall of the container.

3. The apparatus of claim 1 wherein the container comprises a steel inside body wall, an intermediate layer of insulation and an exterior metal skin.

4. The apparatus of claim 1 wherein said baffle has solid side walls and bottom wall where it is adjacent to said evaporator section so that there is longitudinal air flow through said evaporator section.

5. The apparatus of claim 1 wherein said refrigeration unit is removable from said container.

* * * * *